(12) United States Patent
Chmielus (10) Patent No.: US 12,546,807 B2
(45) Date of Patent: Feb. 10, 2026

(54) SPECTRUM ANALYZER, SYSTEM AND METHOD FOR OUTPUTTING DATA FROM A SPECTRUM ANALYZER

(71) Applicant: AARONIA AG, Strickscheid (DE)

(72) Inventor: Thorsten Chmielus, Strickscheid (DE)

(73) Assignee: AARONIA AG, Strickscheid (DE)

( * ) Notice: Subject to any disclaimer, the term of this patent is extended or adjusted under 35 U.S.C. 154(b) by 125 days.

(21) Appl. No.: 18/253,476

(22) PCT Filed: Nov. 15, 2021

(86) PCT No.: PCT/EP2021/081630
§ 371 (c)(1),
(2) Date: May 18, 2023

(87) PCT Pub. No.: WO2022/106330
PCT Pub. Date: May 27, 2022

(65) Prior Publication Data
US 2024/0003946 A1   Jan. 4, 2024

(30) Foreign Application Priority Data
Nov. 18, 2020   (DE) .......................... 102020007046.9

(51) Int. Cl.
*G01R 23/163* (2006.01)
*G01R 23/04* (2006.01)
*H04W 16/14* (2009.01)

(52) U.S. Cl.
CPC ........... *G01R 23/163* (2013.01); *G01R 23/04* (2013.01)

(58) Field of Classification Search
CPC .... H04W 16/14; G01R 29/0892; G01R 23/16
See application file for complete search history.

(56) References Cited

U.S. PATENT DOCUMENTS

| 4,321,680 A * | 3/1982 | Bertrand ............... G06F 17/141 |
| | | 702/77 |
| 4,751,929 A | 6/1988 | Hayakawa et al. |
| 5,038,097 A * | 8/1991 | Imanaka ................ G01R 23/16 |
| | | 324/76.24 |

(Continued)

FOREIGN PATENT DOCUMENTS

| DE | 3689360 T2 | 6/1994 |
| DE | 10329296 A1 | 1/2005 |

(Continued)

OTHER PUBLICATIONS

International Search Report and Written Opinion for PCT Patent App. No. PCT/EP2021/081630 (Mar. 7, 2022).

(Continued)

*Primary Examiner* — Huy Q Phan
*Assistant Examiner* — Temilade S Rhodes-Vivour
(74) *Attorney, Agent, or Firm* — Cermak & McGowan LLP; Malcolm K. McGowan (57) ABSTRACT

A spectrum analyzer (10) comprises a signal input or receiver (11) for receiving a signal, an A/D converter (12) configured to sample the received signal and generate a data stream of IQ-data, a digital processing circuit (13) for generating compressed data from the data stream of IQ-data, and a data interface (19) for outputting the compressed data from the spectrum analyzer (10).

14 Claims, 8 Drawing Sheets

(56) References Cited

U.S. PATENT DOCUMENTS

| | | | |
|---|---|---|---|
| 6,340,883 B1* | 1/2002 | Nara | G01R 35/00 |
| | | | 324/76.23 |
| 7,876,252 B1* | 1/2011 | Wegener | H03M 7/30 |
| | | | 341/51 |
| 10,499,353 B2 | 12/2019 | Barsumian et al. | |
| 2003/0156054 A1 | 8/2003 | Ishii et al. | |
| 2004/0212385 A1* | 10/2004 | Zyss | H04B 17/327 |
| | | | 702/76 |
| 2008/0270440 A1 | 10/2008 | He et al. | |
| 2010/0184384 A1* | 7/2010 | Jones | H04B 17/318 |
| | | | 455/67.11 |
| 2010/0232413 A1* | 9/2010 | Dakshinamurthy | |
| | | | H04L 27/2614 |
| | | | 370/343 |
| 2017/0170917 A1* | 6/2017 | Barsumian | G01R 23/16 |
| 2017/0238203 A1 | 8/2017 | Dzierwa et al. | |
| 2018/0211179 A1* | 7/2018 | Dzierwa | H04B 17/391 |
| 2018/0246152 A1* | 8/2018 | Bartels | G01R 23/167 |
| 2019/0132175 A1* | 5/2019 | Schultze | H04L 27/2017 |
| 2019/0208112 A1* | 7/2019 | Kleinbeck | G08B 25/08 |
| 2020/0244357 A1 | 7/2020 | Heath et al. | |

FOREIGN PATENT DOCUMENTS

| | | |
|---|---|---|
| EP | 2720429 A1 | 4/2014 |
| EP | 2550744 B1 | 5/2020 |
| JP | H07181250 A * | 7/1995 |
| WO | WO2017/121623 A1 | 7/2017 |

OTHER PUBLICATIONS

Office Action from German Patent App. No. 10 2020 007 046.9 (Aug. 30, 2021).

Iglesias, V., et al., "Implementation of a Real-Time Spectrum Analyzer on FPGA Platforms," IEEE Transactions on Nistrumentation and Measurement, 2015, vol. 64, No. 2, pp. 338-355.

International Preliminary Report on Patentability for PCT Patent App. No. PCT/EP2021/081630 (Jun. 1, 2023) with English language translation thereof.

* cited by examiner

SPECTRUM ANALYZER, SYSTEM AND METHOD FOR OUTPUTTING DATA FROM A SPECTRUM ANALYZER

CROSS-REFERENCE TO RELATED APPLICATIONS

This application claims priority from PCT/EP2021/081630, filed 15 Nov. 2021, which claims priority from German Application 10 2020 007 046.9, filed 18 Nov. 2020. The contents of these priority applications are incorporated herein by reference in their entirety.

TECHNICAL FIELD

The invention relates to spectrum analyzers and electronic computing devices which are configured for communication with a spectrum analyzer. In particular, the invention relates to spectrum analyzers having a data interface for outputting data for storage and/or further processing by a computer or server.

BACKGROUND

Spectrum analyzers provide a high amount of data. The data typically comprise amplitude and phase information and are often present in the form of IQ-data with an in-phase (I) and quadrature (Q) component.

WO 2017/121623 A1 describes a spectrum analyzer with increased real-time bandwidth.

US 2008/0270440 A1 describes a data compression method for generating spectral traces.

It is desirable to be able to output data from the spectrum analyzer for storage and/or further processing to a connected computer or server. Due to the high amount of data generated by the spectrum analyzer and the typically available data rate of the connection between the spectrum analyzer and the computer, the continuous output of IQ-data quickly reaches its limits. This leads to a limitation of the real-time bandwidth of the IQ-data that can continuously be output from the spectrum analyzer. For instance, the use of a USB 3.0 connection with a data rate of 5 Gbit/s leads to a limitation of the real-time bandwidth of 40 MHz of the transferred data.

It is desirable fora number of applications to enable a means of transferring data from the spectrum analyzer with greater real-time bandwidths.

BRIEF DESCRIPTION OF THE INVENTION

The invention is based on the object of providing improved spectrum analyzers. The invention is particularly based on the object of providing a spectrum analyzer and a method which enable respectively data to be output with greater real-time bandwidth via a data interface.

According to the invention, a spectrum analyzer and a method are provided as defined in the independent claims. The dependent claims define preferred or advantageous exemplary embodiments.

A spectrum analyzer according to the invention comprises: a signal input or receiver for receiving a signal, an A/D converter which may be configured to sample the received signal and generate a data stream of IQ-data, a digital processing circuit for generating compressed data from the data stream of IQ-data, and a data interface for transferring the compressed data from the spectrum analyzer.

The digital processing circuit may be configured to execute real-time compression of the IQ-data to generate the compressed data.

The digital processing circuit may be configured to compare the IQ-data or data derived therefrom in the spectral space (e.g., an amplitude or power spectrum) with at least one threshold value to generate the compressed data. Values below the threshold may be replaced with a constant value, e.g., the threshold value or 0.

The data can be transferred efficiently by replacing values below the threshold with the constant value. For instance, information about the frequency ranges in which the constant value is present may be output. Compared to the output of original IQ-data or the amplitude or power spectrum, this results in a significant data reduction since values of the IQ-data or the amplitude or power spectrum below the threshold do not have to be output separately for each of the frequencies.

The threshold value may be fixed or user configurable.

The electronic processing circuit may be configured to determine the threshold value automatically, e.g., depending on a medium noise level.

The digital processing circuit may be configured to determine an amplitude or power spectrum of the IQ-data, particularly by means of fast Fourier transform (FFT), and to generate at least part of the compressed data from the amplitude or power spectrum.

Part of the amplitude or power spectrum may be output as compressed data. Since the amplitude or power spectrum does not contain phase information (which is often irrelevant to the user), the real-time bandwidth of the transferred data may be increased.

The digital processing circuitry may be configured for data reduction of noise of the amplitude or power spectrum and/or IQ-data in order to generate the compressed data.

The data reduction of the noise may include at least sectional smoothing of the noise of the amplitude or power section and/or IQ-data.

The data reduction may include smoothing of background noise. For this purpose, parts of the spectrum in which only background noise is present may be replaced with a constant value or the average value of the amplitude or power spectrum and/or the IQ-data in the corresponding frequency range. Instead of the noisy amplitude or power spectrum, only an indication of start and stop frequency (or other indication of the position of the frequency range, such as midfrequency and width) as well as the averaged level in the corresponding frequency range must be output in the compressed data via the data interface.

The digital processing circuit may be configured for data reduction of at least one peak of the amplitude or power spectrum and/or Q-data in order to generate the compressed data.

The data reduction of the at least one peak may include smoothing of the at least one peak.

The data reduction of the at least one peak may include approximation of the peak by a predetermined carrier type.

The predefined carrier types may comprise spectral masks of one or a plurality of communication standards.

The spectral masks may comprise, e.g., spectral masks according to IEEE 802.11 or cellular communication standards such as LTE (4G) or LTE-A (5G).

The digital processing circuit may be configured to transfer a unique identifier of the identified carrier type via the data interface.

The carrier type may be parametrizable. Typical parameters may include, e.g., a level, a width (in the frequency space) and/or section-wise gradients in the carrier type (as a function of frequency).

The digital processing circuit may be configured for determining a plurality of parameters of the predefined carrier type and for transferring the plurality of parameters as part of the compressed data.

The plurality of parameters may comprise a signal level of the carrier type and/or a width of the carrier type, wherein the signal level and/or the width are automatically determined such that the carrier type approximates the actual peak in the IQ-data and/or the amplitude or power spectrum by said parametrization.

The spectrum analyzer may be configured to output both compressed data from the IQ-data and compressed data dependent on the amplitude or power spectrum via the data interface.

Prior to the transfer, real-time IQ-data compression may be executed.

In real-time IQ-data compression, values in the I-data and the Q-data which are smaller than a threshold value may be replaced with a constant value (which, e.g., may be equal to the threshold value or equal to 0).

This allows for data (e.g., information about channel utilization, duration of the transmission, signal strength, subsidiary signals, disturbing signals, etc.) relevant for a spectrum display to be transferred with a greater real-time bandwidth, while the transmission of the IQ-data (i.e., the data containing amplitude and phase information) may be limited to a smaller real-time bandwidth. For instance, IQ-data (i.e., data containing amplitude information) may be output only selectively for one or a plurality of frequency ranges particularly relevant to the user.

The output IQ-data may be assigned to a first frequency range, and the compressed data generated from the amplitude or power spectrum without phase information may be assigned to a second frequency range.

The second frequency range may be greater than the first frequency range.

The digital processing circuit may be configured to determine a carrier type for each of a plurality of frequency ranges for generating the compressed data, wherein the carrier type approximates a peak (in the IQ-data or in the amplitude or power spectrum) in the corresponding frequency range and to output a unique identifier for the carrier type. The digital processing circuit may be configured to determine a level of the carrier type in the frequency range for each of a plurality of frequency ranges for generating the compressed data and to output the compressed data via the data interface as part of the compressed data. Information about the frequency range (e.g., start and stop frequency or midfrequency and width) and/or about the carrier type (e.g., unique identification of the carrier type by an identifier) may also be output as part of the compressed data.

The spectrum analyzer may further comprise a storage coupled with the digital processing circuit for storing a plurality of predefined carrier types and/or a plurality of predefined frequency ranges (channels).

The digital processing circuit may be configured to retrieve information via a plurality of predefined carrier types and/or a plurality of predefined frequency ranges (channels) via the data interface or an interface of the spectrum analyzer separate from the data interface.

Irrespective of whether a database of predefined carrier types is held locally in the spectrum analyzer in a nonvolatile manner or retrieved by the spectrum analyzer from an external device, the plurality of predefined carrier types may comprise spectral masks of at least one communication standard, in particular a radio standard (e.g., IEEE 802.11 or cellular communication standards such as LTE (4G) or LTE-A (5G)). The plurality of predefined frequency ranges may comprise channels of at least one communication standard, in particular a radio standard (e.g., IEEE 802.11 or cellular communication standards such as LTE (4G) or LTE-A (5G)).

The digital processing circuit may be configured to generate and output compressed data for a plurality of time intervals, respectively.

The compressed data may be output in real-time.

The digital processing circuit may be configured to employ one of the compression techniques described herein for each of the time intervals to generate the compressed data.

The digital processing circuit may be configured to determine, for each of the time intervals, a carrier type and a level of the carrier type in the frequency range for each of a plurality of frequency ranges and to output the carrier type via the data interface as part of the compressed data. Information about the frequency range (e.g., start and stop frequency or midfrequency and width) and/or about the carrier type (e.g., unique identification of the carrier type by an identifier) may also be transferred as part of the compressed data for the corresponding time interval.

The digital processing circuit may be configured to determine a number of identical temporal repetitions of a signal and output the same as part of the compressed data.

The data interface may be or comprise at least one of the following interfaces: a USB interface, an Ethernet interface, a wireless interface, in particular a WLAN interface or cellular interface.

The digital processing circuit may comprise at least one field-programmable gate array, FPGA.

According to a further aspect of the invention, an electronic computing unit is disclosed which is configured to store and/or process compressed data transferred by the spectrum analyzer.

The electronic computing unit may comprise at least one integrated semiconductor circuit, in particular at least one processor, which is configured to generate from the compressed data a lossy representation of the IQ-data and/or the amplitude or power spectrum in the frequency space and/or frequency-time space.

The electronic computing unit may be configured, depending on identifiers for carrier types contained in the compressed data, to access a database which assigns corresponding signal forms to the carrier types. The database may be stored locally in the electronic computing unit in a nonvolatile manner. Alternatively or additionally, the electronic computing unit may be configured to access the database of signal forms from the spectrum analyzer.

The electronic computing unit may be configured to execute an extrapolation between a signal form that is assigned to a carrier type defined by the compressed data and comprises a level defined by the compressed data (and optionally a width defined by the compressed data) and surrounding frequency ranges to reconstruct the lossy representation of the IQ-data and/or the amplitude or power spectrum.

A system comprises a spectrum analyzer according to the invention and an electronic computing unit coupled with the data interface, in particular a computer or server, for processing and/or storing the compressed data.

A method for transferring data from a spectrum analyzer, in particular for transferring data continuously from a real-time spectrum analyzer, comprises the following steps: A/D conversion of determined signals in order to generate a data stream of IQ-data, generating compressed data from the data stream of IQ-data, and transferring the compressed data from the spectrum analyzer via a data interface.

The method may be carried out with the spectrum analyzer or the system according to an exemplary embodiment.

Further features of the method and the effects achieved therewith correspond to the features and effects described with respect to the spectrum analyzer.

The spectrum analyzer according to the invention and the method according to the invention allow for the transfer of data with greater real-time bandwidth than conventional methods.

BRIEF DESCRIPTION OF THE DRAWINGS

Exemplary embodiments of the invention are described with respect to the figures.

DETAILED DESCRIPTION OF EXEMPLARY EMBODIMENTS

Exemplary embodiments of the invention are described with respect to the figures, in which corresponding or similar units are indicated with corresponding or similar reference signs. The features of different exemplary embodiments may be combined with each other unless this is expressly excluded in the following description.

Figure 1:
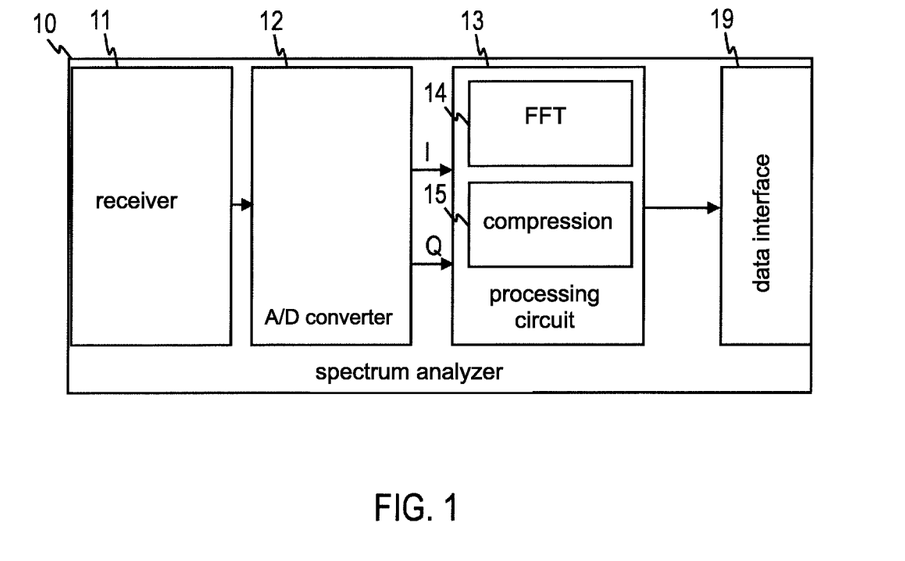
FIG. 1 is a block view of a spectrum analyzer.

FIG. 1 is a block view of a spectrum analyzer 10 according to an exemplary embodiment. The spectrum analyzer 10 may be a real-time spectrum analyzer. The spectrum analyzer 10 may be configured to execute frequency sweeps in order to time-dependently determine information about frequency and phase position of analog signals received at a receiver 11 or an input interface. The spectrum analyzer 10 may be configured as a handheld device or a portable device.

The spectrum analyzer 10 comprises an A/D converter 12. The A/D converter may comprise an A/D preamplifier and is configured for sampling of the analog signal.

The spectrum analyzer 10 comprises a digital processing circuit 13. The digital processing circuit 13 may comprise one or a plurality of integrated circuits. The digital processing circuit 13 may comprise a field-programmable gate array (FPGA). Alternatively or additionally, the digital processing circuit 13 may comprise one or a plurality of a processor, a controller, an application-specific integrated circuit (ASIC) or a different semiconductor integrated circuits.

The processing circuit 13 may comprise a hardware or programmed circuit for performing a compression 15. By compression, compressed data is generated from the IQ-data, which are output via a data interface 19 from the spectrum analyzer 10.

The processing circuit 13 may comprise a hardware or programmed circuit for carrying out fast Fourier transformation (FFT) in order to generate the IQ-data.

The term "compressed data" as used herein refers to data that has a reduced amount of data compared to the IQ-data provided by the A/D converter 12.

The data interface 19 may be a wired or wireless interface for data communication. During operation of the spectrum analyzer 10, the data interface 19 may be coupled with an electronic computing unit, e.g., a computer or server, in order to output the compressed data. The data interface 19 may be a USB interface, an Ethernet interface, or a wireless interface, particularly a WLAN interface or cellular interface.

The compressed data can be generated in different ways.

The processing circuit 13 may be configured to apply real-time compression to the IQ-data (i.e., data with amplitude and phase information). The compressed IQ-data generated by real-time compression may be output via the data interface 19 as compressed data.

As described in more detail with respect to FIG. 4 to FIG. 7, real-time compression of the IQ-data may include at least sectional smoothing of the IQ-data (e.g., by replacing the background noise with a constant value). The at least sectional smoothing facilitates the compression. For instance, instead of IQ-data representing only background noise, only an indication of the start and stop frequency of the frequency range in which the IQ-data have been replaced with the constant value has to be transmitted.

Oftentimes, phase information is not or only slightly relevant for further processing and/or storage in a computer or server coupled with the spectrum analyzer 10. For instance, the power received in different frequency ranges (e.g., due to channel occupancy or subsidiary signals) is relevant for many users, but the phase position of the respective signals is not. Information for a so-called spectrum display (such as channel utilization, transmission duration, signal strength, subsidiary signals, and/or disturbing signals) may be transmitted by transmitting the amplitude spectrum, i.e., a spectral representation without phase information.

The processing circuit 13 may be configured to generate the compressed data from a spectral representation, in particular an amplitude spectrum or a power spectrum, and to output the same via the data interface 19. The amplitude spectrum may be calculated by the processing circuit 13 according to, e.g., $x(f) = \sqrt{I(f)^2 + Q(f)^2}$. Part of the amplitude spectrum or the complete amplitude spectrum may be output via the data interface 19. As an alternative, a power spectrum may be calculated by the processing circuit 13 according to, e.g., $P(f)=I(f)^2+Q(f)^2$. Part of the power spectrum or the complete power spectrum may be output via the data interface 19. In the following, only the term "amplitude spectrum" will be used. It goes without saying that the techniques described in the following can also be applied if the power spectrum (or another spectral representation of the analog signal quantifying the amplitude or power) is determined and further compressed.

The calculation and output of a part of the amplitude spectrum may be repeated (e.g., each time a frequency sweep is completed) in order to time-dependently output the information relevant for a spectrum display.

The processing circuit 13 may be configured to subject the amplitude spectrum and/or the complex-valued spectral representation represented by the I and Q-data to one or a plurality of further processing steps for data reduction before the compressed data is output. A few potential processing steps for further data compression are demonstrated with respect to FIG. 2 to FIG. 14.

The processing circuit 13 may be configured to smooth the amplitude spectrum. The smoothing step may be carried out at least sectionally. The smoothing step may be carried out depending on whether only noise is present in the frequency space or whether a peak of the amplitude spectrum (i.e., a carrier) is present. The smoothing step may be carried out depending on one or a plurality of predefined frequency ranges (e.g., the frequency ranges to which the plurality of channels of a data communication technique are assigned, e.g., channels according to IEEE 802.11, LTE (4G) or LTE-A (5G)).

The processing circuit 13 may be configured to identify and smooth a background noise in the spectrum. The identification of the background noise may include a threshold value comparison with a threshold value 39. Values below the threshold may be replaced with a constant value. The constant value may be equal to 0 or equal to the threshold value. The smoothing of the background noise may thus correspond to a "clipping" of signal values below the threshold. The constant value which background noise is replaced with may be determined depending on the background noise, e.g., by averaging the background noise in the corresponding frequency range. The smoothing may comprise averaging of the background noise. The averaging may take place via a corresponding frequency range in which only background noise is present.

For a frequency range in which only background noise is present, the spectral representation does not have to be transmitted in the compressed data. For instance, the processing circuit 13 may generate the compressed data such that, instead of the background noise, the compressed data comprise an indication of the frequency range (e.g., an indication of start and stop frequency or a different indication such as midfrequency and width) and (if the noise level is of interest) an indication of the smoothed noise level of the background noise. The smoothed noise level may be determined in the corresponding frequency range by averaging the background noise.

Figure 2:
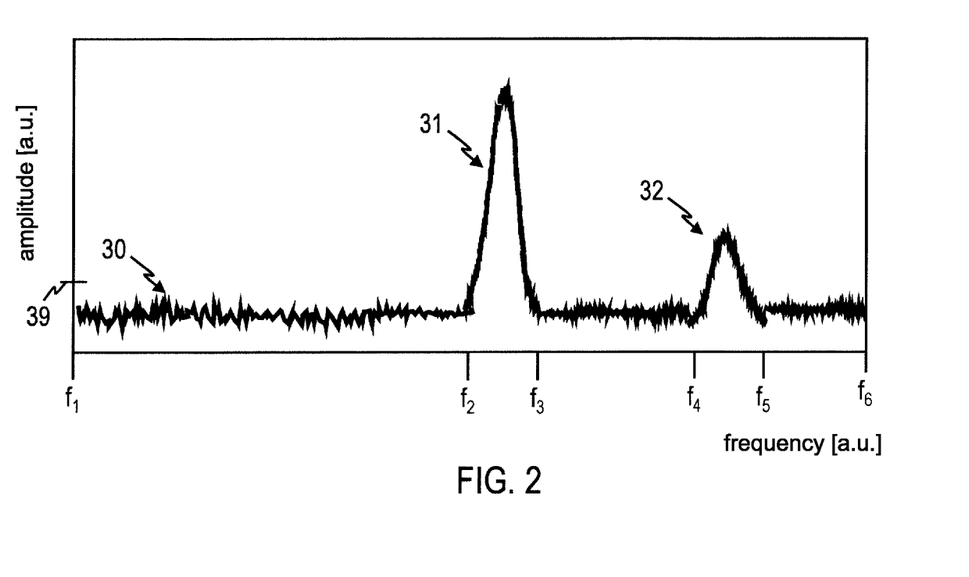
FIG. 2 is an exemplary amplitude spectrum.
Figure 3:
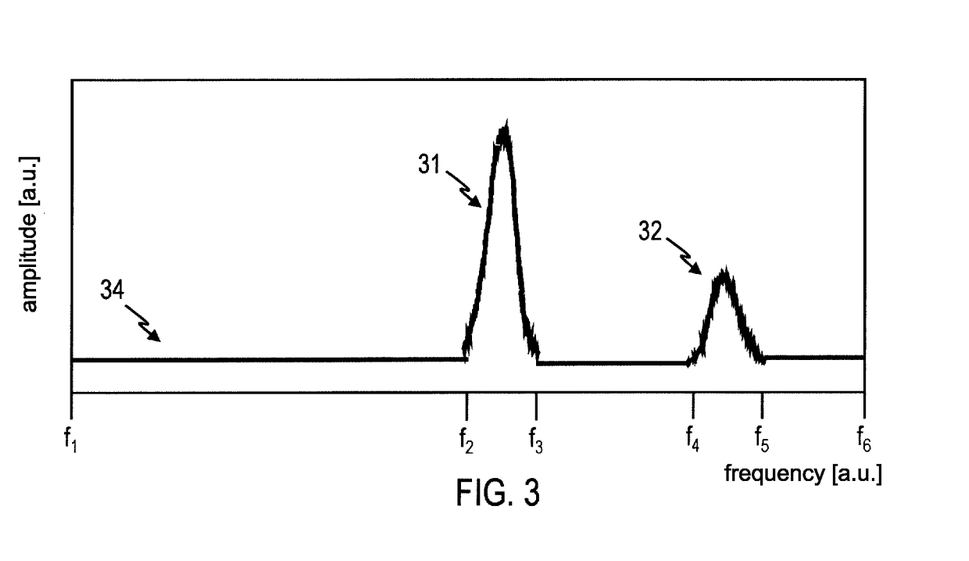
FIG. 3 shows a data-reduced illustration of the amplitude spectrum of FIG. 2 generated by compression.

FIG. 2 and FIG. 3 illustrate said compression technique. FIG. 2 shows an exemplary amplitude spectrum 30 with a plurality of peaks 31, 32. In the frequency ranges from $f_1$ to $f_2$, $f_3$ to $f_4$, and $f_5$ to $f_6$, the amplitude spectrum comprises only background noise but no carrier.

The compressed data may be generated and output such that they indicate the corresponding frequency ranges $f_1$ to $f_2$, $f_3$ to $f_4$, and $f_5$ to $f_6$, in which only background noise is present, as well as a level of the background noise in the corresponding frequency ranges (which level can be determined, e.g., by means of averaging the amplitude spectrum in the corresponding frequency range).

The compressed data may be generated and transferred such that they contain at least the amplitude information with respect to the frequency ranges in which peaks 31, 32 are present (or, more general, in relevant frequency ranges which, e.g., can be determined by the channels of a data communication standard). For instance, in the frequency ranges from $f_2$ to $f_3$ and of $f_4$ to $f_5$, the complete amplitude spectrum may be contained in the compressed data. By smoothing the background noise, a significant compression is achieved, which allows for a transfer of data with greater real-time bandwidth.

A compression in which a smoothing of background noise with subsequent output only of cutoff frequencies of the frequency range in which only background noise is present, and with optional output of the constant value with which the background noise is replaced in the corresponding frequency range can not only be applied to an amplitude or power spectrum but also to the IQ-data. This is explained by means of FIG. 4 to FIG. 7.

Figure 4:
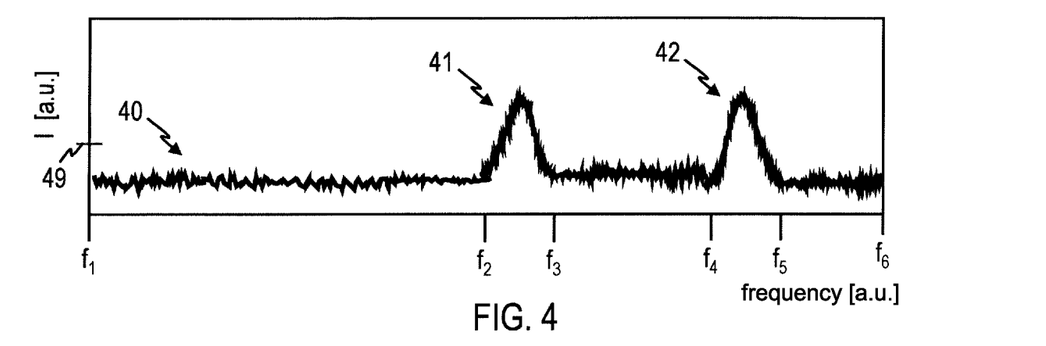
FIG. 4 shows exemplary I-data.
Figure 5:
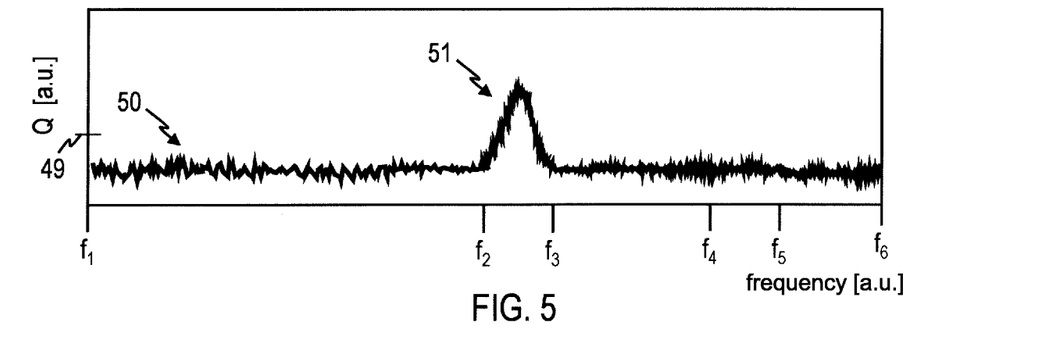
FIG. 5 shows exemplary Q-data.
Figure 6:
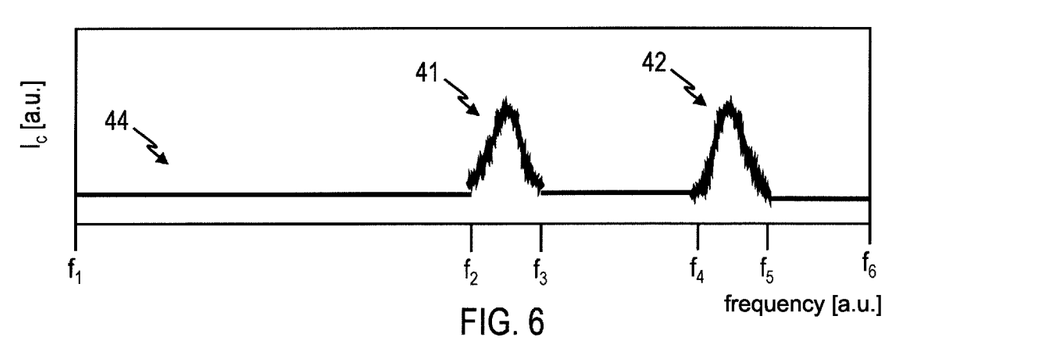
FIG. 6 shows a data-reduced illustration of I-data of FIG. 4 generated by compression.
Figure 7:
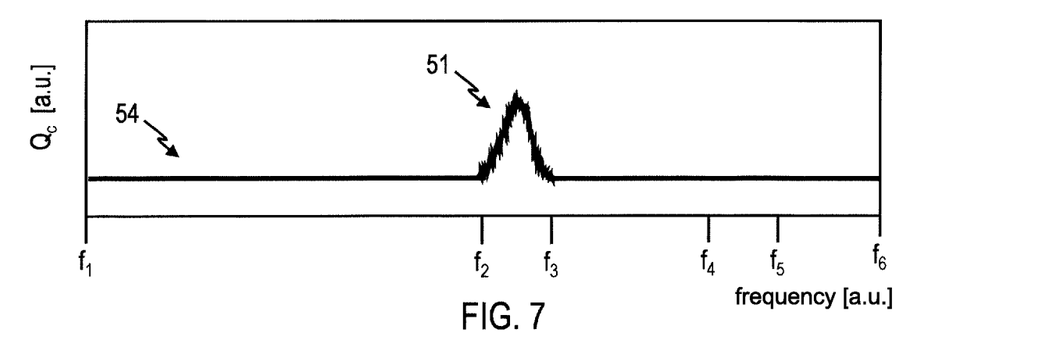
FIG. 7 shows a data-reduced illustration of Q-data of FIG. 2 generated by compression.
Figure 8:
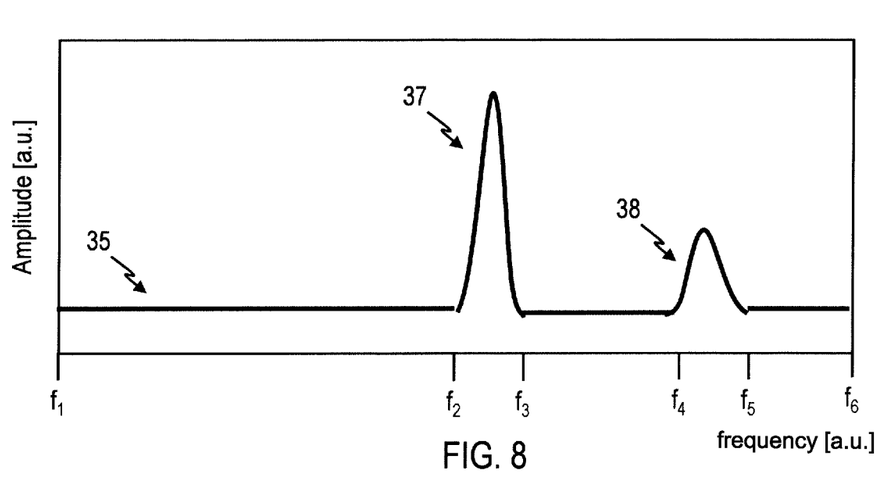
FIG. 8 shows a data-reduced illustration of the amplitude spectrum of FIG. 2 generated by compression.

FIG. 4 and FIG. 5 exemplarily show I-data 40 and Q-data 50 in the frequency space. The I-data 40 comprise one or a plurality of peaks 41, 42. The Q-data 50 comprise one or a plurality of peaks 51.

The evaluation circuit 13 may subject the I-data 40 and Q-data in the time or frequency space to a threshold value comparison with a threshold value 49 (which may be selected to be the same or different with respect to the I and Q-data). The evaluation circuit 13 may smooth background noise by setting all data falling below the threshold value 49 to a constant value. As described above, the constant value may, e.g., be equal to the threshold value, equal to 0, or equal to an average value of the background noise.

As regards the frequency ranges from $f_1$ to $f_2$, $f_3$ to $f_4$, and $f_5$ to $f_6$ in which only background noise is present in the I-data, the smoothed I-data $I_c$ in the frequency space (FIG. 6) is transmitted in a compressed manner in that only one indication of the frequency ranges (e.g., by indicating the cutoff frequencies $f_1$ to $f_2$, $f_3$ to $f_4$, and $f_5$ to $f_6$) and optionally an instance of the constant value is output. The peaks 41, 42 may be output without additional compression or, as described in more detail below, also in a further compressed manner. A similar technique may be applied in the space of time as well.

As regards the frequency ranges from $f_1$ to $f_2$, and $f_3$ to $f_6$ in which only background noise is present in the Q-data, the smoothed Q-data Qc in the frequency space (FIG. 7) is transmitted in a compressed manner in that only one indication of the frequency ranges (e.g., by indicating the cutoff frequencies $f_1$ to $f_2$ and $f_3$ to $f_6$) and optionally one instance of the constant value is transferred. The peak 51 may be output without additional compression or, as described in more detail below, also in a further compressed manner. A similar technique may be applied in the space of time as well.

In a further embodiment, also the signal portions or carriers, which correspond to the peaks 31, 32, 41, 42, 51 in the spectrum, may be simplified in their complexity in order to reduce the data amount. For instance, a smoothing operation may be applied to the peaks 31, 32, 41, 42, 51. The noisy peaks 31, 32, 41, 42, 51 may be incorporated into the compressed data as a smoothed and thus data-reduced carrier. With the help of this smoothing step, the peaks 31, 32, 41, 42, 51 may be output in the frequency ranges from $f_2$ to $f_3$ and from $f_4$ to $f_5$, e.g., at a frequency resolution $\Delta f$ that is coarser than the frequency resolution of the IQ-data.

Alternatively or additionally, the data-reduced output of the peaks 31, 32, 41, 42, 51 in the compressed data may take place at a higher compression rate in that signals/carrier types and their signal form are assigned to predefined carrier types which are stored locally in the storage of the spectrum analyzer 10 or retrievable from a separate device by the spectrum analyzer 10. The processing circuit 13 may be configured to incorporate only the carrier type and its signal strength and position in the spectrum into the compressed data and output it from the spectrum analyzer. This may also be applied to the background noise.

For example, a spectrum with an individual carrier 31, 32, 41, 42, 51 in the spectrum as well as with background noise surrounding the carrier may be transmitted as follows: noise at level "$x_1$" at start frequency "$f_1$" and stop frequency "$f_2$", signal of type "A" with level "$x_2$" at start frequency "$f_2$" and stop frequency "$f_3$", noise at level "$x_3$" at start frequency "$f_3$" and stop frequency "$f_4$", etc. Thus, the processing circuit 13 may generate the compressed data for each of a plurality of frequency ranges such that it comprises, e.g.,

- a unique identifier for one of a plurality of predefined carrier types (e.g., different signal forms in the frequency range) or noise,
- a signal level, and
- an indication of the frequency range (e.g., an indication of start and stop frequency or a midfrequency and width).

The indication of the frequency range may be simplified or omitted if different channels are predefined and/or carriers are uniquely assigned to respective frequency ranges.

The spectrum analyzer 10 may be configured such that it outputs a list of carrier types based on a database with frequency and level in the compressed data. This is exemplarily illustrated in FIG. 8. The spectrum 30 of FIG. 2 may be processed such that instead of each of the peaks 31, 32, an identifier for a carrier type (e.g., for a peak in the form of a Gaussian curve, a Lorenz curve, etc.), the signal level (indicating the amplitude level of the peak), and the frequency range (indicating the width of the peak) are output in the compressed data. The peaks 31, 32 are thus effectively replaced with data-reduced peaks 37, 38 which are determined on the basis of carrier types defined in a database.

Figure 9:
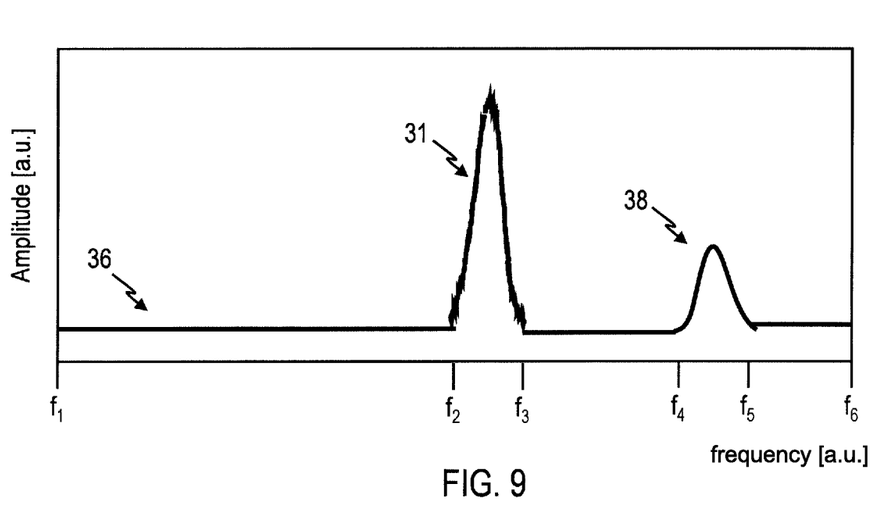
FIG. 9 shows a data-reduced illustration of the amplitude spectrum of FIG. 2 generated by compression.

The different techniques of the compression for data reduction may be combined. In this way, a certain carrier may be transmitted as IQ-data (particularly inclusive of phase information, optionally inclusive of noise), the background noise may be smoothed, and all other carriers may be transmitted with reference to a database of carrier types. With reference to FIG. 2 and FIG. 9, the processing circuit 13 may be configured such that the peak 31 is transmitted as amplitude or power data (i.e., without phase information) or as IQ-data (including phase information not shown in FIG. 9), the background noise may be smoothed in the frequency ranges from $f_1$ to $f_2$, $f_3$ to $f_4$, and $f_5$ to $f_6$, and the peak 32 is transmitted with reference to a carrier type in a database (and thus as data-reduced peak 38).

Figure 10:
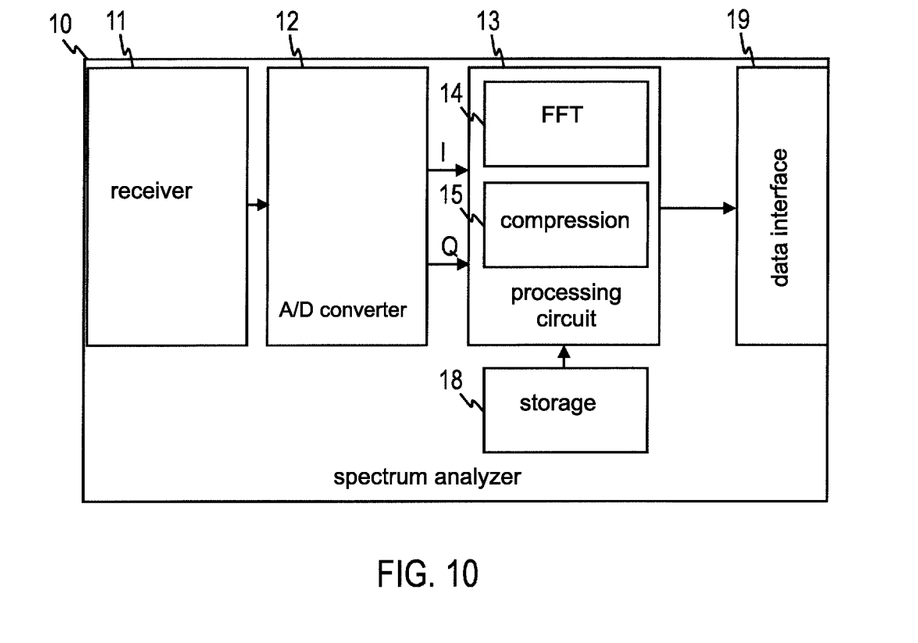
FIG. 10 is a block view of a spectrum analyzer.

FIG. 10 is a block view of a spectrum analyzer 10. The spectrum analyzer comprises a storage 18 in which predefined carrier types and/or predefined frequency ranges (e.g., carrier frequencies of a data communication standard) are deposited. The processing circuit 13 is configured to match carriers (i.e., peaks in the spectral representation) with carrier types in the storage and/or to retrieve information about those frequency ranges in which background noise can be replaced with smoothed, constant noise levels. This information may be used to generate the compressed data for output.

The carrier types and/or predefined frequency ranges stored in the storage 18 may be user-configurable, e.g., depending on the intended use of the spectrum analyzer.

The carrier types stored in the storage 18 may comprise spectral masks of at least one communication standard, particularly a radio standard (e.g., IEEE 802.11, LTE (4G) or LTE-A (5G)).

The predefined frequency ranges stored in the storage 18 may comprise channels of at least one communication standard, particularly a radio standard (e.g., IEEE 802.11, LTE (4G) or LTE-A (5G)).

Figure 11:
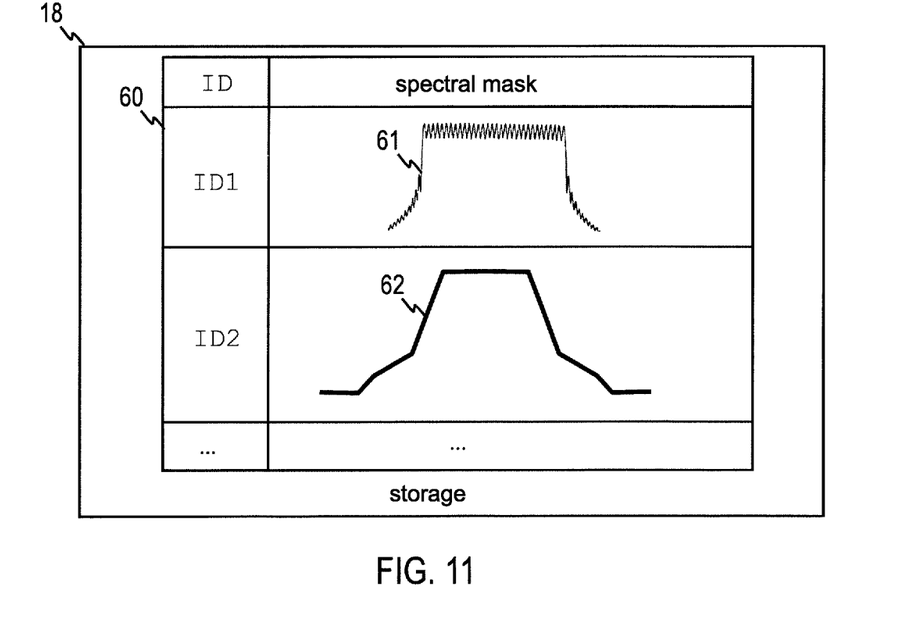
FIG. 11 is a schematic illustration of a database of carrier types which is stored in the spectrum analyzer or accessible via the spectrum analyzer.

FIG. 11 exemplarily shows a database 60 of carrier types. Different signal forms 61, 62 are deposited in the database 60 with a unique identifier assigned thereto. The signal forms may be parametrizable signal forms. For instance, section-wise gradients and/or section widths of a signal form 62 may be variable parameters. While only two signal forms are illustrated exemplarily, the database 60 may store more signal forms (e.g., more than ten, more than twenty, etc.).

In operation, the processing circuit 13 may determine whether a portion (in particular, a peak) in the amplitude or power spectrum 30, in the I-data 40, and/or in the Q-data 50 is approximable by one of the signal forms 61, 62 of the database. In operation, the processing circuit 13 may determine which of the signal forms 61, 62 of the database 60 optimally approximates a portion (in particular, a peak) in the amplitude or power spectrum 30, in the I-data 40 and/or the Q-data 50. To this end, a difference between the acquired spectrum 30, 50 and each of the plurality of signal forms may be determined and evaluated using a similarity metric (such as a root mean square) to determine which of the signal forms 61, 62 of the database 60 optimally approximates a portion (in particular, a peak) in the amplitude or power spectrum 30, in the I-data 40, and/or in the Q-data 50.

In the case of a parameterizable signal form 62, one or a plurality of parameters, such as sectional gradients of the signal form and/or widths of sections of the signal form, may also be determined so that the signal form with its parameterization optimally approximates a portion (in particular, a peak) in the amplitude or power spectrum 30, in the I-data 40 and/or the Q-data 50.

When using a database 60 with a plurality of carrier types, in the compressed data, only

- a unique identifier for one or a plurality of predefined carrier types (e.g., different signal forms in the frequency range) or noise,
- a signal level,
- an indication of the frequency range (e.g., an indication of start and stop frequency or a midfrequency and width), and
- optionally, in the case of a parametrizable signal form, one or a plurality of additional parameters of the signal form are output via the data interface.

Alternatively or additionally, the processing circuit 13 may be configured to retrieve information about carrier types and/or predefined frequency ranges from a storage separate from the spectrum analyzer 10. The retrieval may be carried out via the data interface 19 or a data interface 19 different therefrom.

The processing circuit 13 may then use this information for generating the compressed data, e.g., by means of one of the methods described above.

Alternatively or additionally, the spectrum analyzer 10 may be configured to output information about carrier types and/or predefined frequency ranges of the database to the electronic computing unit, which receives the compressed data, via the data interface 19. The electronic computing unit in the spectrum analyzer 10 may retrieve non-volatile stored information about signal forms 61, 62 and their respective identifiers and use it to process the compressed data in this way.

The determination and output of carrier types at different frequencies (e.g., at the channels of a communication standard) may be repeated time-sequentially. This may take place, e.g., each time after a frequency sweep has been performed by the spectrum analyzer 10.

Figure 12:
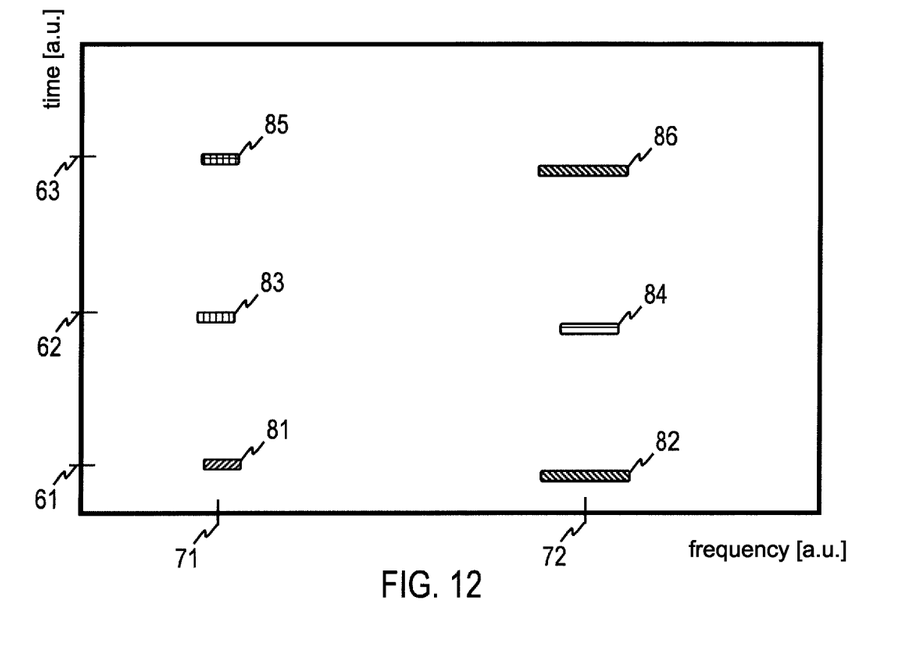
FIG. 12 is a schematic view of a frequency-time space to explain the operation of the spectrum analyzer.

FIG. 12 exemplarily shows a frequency-time space. At a first time 61, the spectrum analyzer 10 may record a first set of IQ-data. For this purpose, the spectrum analyzer 10 may perform a frequency sweep. From the IQ-data recorded at the first time 61, the processing circuit 13 may determine that an amplitude or power spectrum (or an FFT of the IQ-data) may be illustrated by a first carrier type at a first frequency 71, which carrier type is schematically illustrated as a shaded area 81. From the IQ-data collected at the first time 61, the processing circuit 13 may determine that the amplitude or power spectrum (or an FFT of the IQ-data) may be illustrated by a second carrier type at a second frequency 72, which carrier type is schematically illustrated as a shaded area 82. In the compressed data, identifiers for these carrier types as well as optionally further parameters (levels, cutoff frequencies/peak width) may be transferred. The carrier types can be automatically recognized in each case by database matching.

At a second time 62, the spectrum analyzer 10 may collect a second set of IQ-data. To this end, the spectrum analyzer 10 may perform a further frequency sweep. From the IQ-data collected at the second time 62, the processing circuit 13 may detect that an amplitude or power spectrum (or an FFT of the IQ-data) may be illustrated by a third carrier type at the first frequency 71, which carrier type is schematically illustrated as a shaded area 83. From the IQ-data collected at the second time 62, the processing circuit 13 may detect that the amplitude or power spectrum (or an FFT of the IQ-data) may be illustrated by a fourth carrier type at the second frequency 72, which carrier type is schematically illustrated as a shaded area 84. In the compressed data, identifiers for these carrier types as well as optionally further parameters (levels, cutoff frequencies/peak width) may be output. The carrier types can be automatically recognized respectively by database matching.

At a third time 63, the spectrum analyzer 10 may collect a third set of IQ-data. To this end, the spectrum analyzer 10 may perform a further frequency sweep. From the IQ-data collected at the third time 63, the processing circuit 13 may detect that an amplitude or power spectrum (or an FFT of the IQ-data) may be illustrated by a fifth carrier type at the first frequency 71, which carrier type is schematically illustrated as a shaded area 85. From the IQ-data collected at the third time 63, the processing circuit 13 may detect that the amplitude or power spectrum (or an FFT of the IQ-data) may again be illustrated by the second carrier type at the second frequency 72, which carrier type is schematically illustrated as a shaded area 86. In the compressed data, identifiers for these carrier types as well as optionally further parameters (levels, cutoff frequencies/peak width) may be output. The carrier types can be automatically recognized in each case by database matching.

With respect to some of the occupied channels 71, 72, data including phase information may be output selectively. For instance, selectively for one of a plurality of channels 71, 72, data containing phase information (e.g., compressed IQ-data) may be output, while for another of a plurality of channels 71, 72, only amplitude or power information without phase information may be used to generate the compressed data.

A further possibility for further data reduction concerns the time domain. Thus, some of the previously mentioned techniques may also be applied to the time domain. This results in another possibility for reducing the amount of data which scales linearly with the amount of time buffer, however at the cost of a corresponding time delay. For example, instead of time-sequentially transmitting N>2 repeated spectra of an identical signal, it could be summarized as follows: Noise with level "$x_1$" at start frequency "$f_1$" and stop frequency "$f_2$", signal of type "A" with level "$x_2$" at start frequency "$f_2$" and stop frequency "$f_3$", noise with level "$x_3$" at start frequency "$f_3$" and stop frequency "$f_4$", etc. For a signal repeating in time, instead of transmitting these data identically—at the expense of a transmission latency—an indication N of the number of repetitions in the compressed data can be output.

Figure 13:
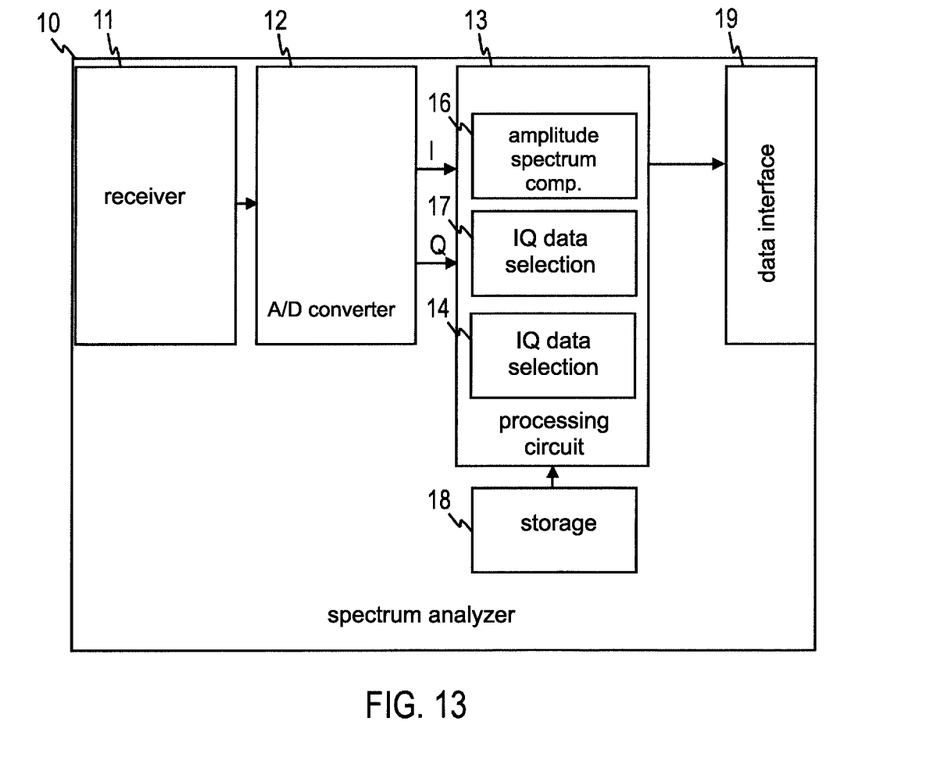
FIG. 13 is a block view of a spectrum analyzer.

FIG. 13 is a block view of a spectrum analyzer 10. The processing circuit 13 of the spectrum analyzer 10 comprises a hardware or programmed circuit for performing compression of the amplitude spectrum 16 and a hardware or programmed circuit for selecting IQ-data 17 to be transmitted.

IQ-data to be transmitted (i.e., data which are transferred including phase information) may be selected, e.g., depending on predefined frequency ranges and/or depending on signal levels of the carrier types which are deposited in the storage 18. The IQ-data to be transmitted may optionally be smoothed, e.g., by applying a smoothing operation to the I and Q-data prior to transmission. The compression of the amplitude spectrum in those frequency ranges for which no IQ-data is transmitted may comprise smoothing and/or with reference to carrier types deposited in the storage 18, as described above.

Figure 14:
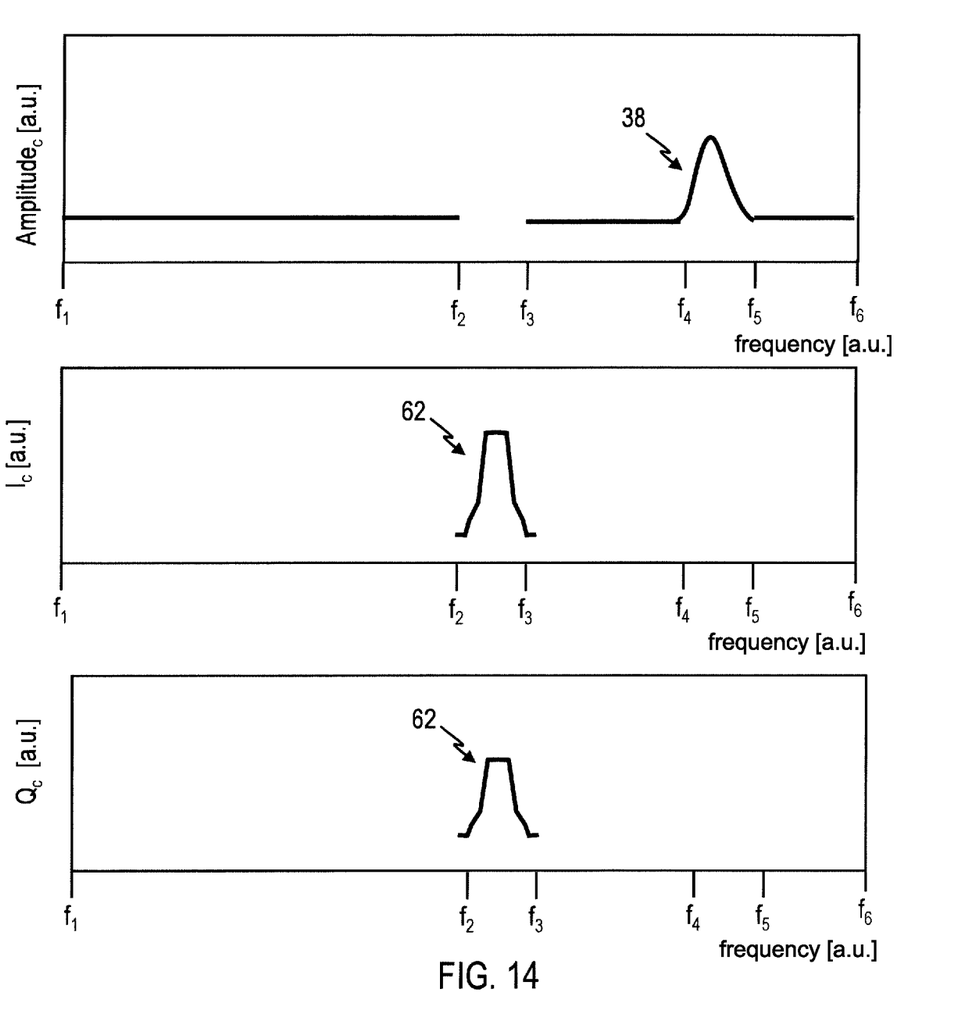
FIG. 14 shows a data-reduced illustration of IQ-data of FIG. 4 and FIG. 5 generated by compression.

FIG. 14 illustrates this by way of example for the IQ-data in the frequency space shown in FIG. 4. For a frequency range from $f_2$ to $f_3$, which may correspond to a channel of a wired or wireless communication link, data including phase information can be output. For this purpose, e.g., a signal form defined as a signal mask for the corresponding standard may be read from the database 60, and a unique identifier for the signal form may be transferred. This effectively approximates the peaks 41, 51 by a signal form 62 from the database. For all frequency ranges outside of one or more channels (e.g., for frequencies less than $f_2$ and frequencies greater than $f_3$), only amplitude information can be transmitted. This can be compressed as explained with reference to FIGS. 2 to 11.

In any of the described embodiments, the processing circuit 13 may be or may comprise an FPGA.

In any of the described embodiments, the data interface 19 may be selected from the group consisting of a USB interface, an Ethernet interface, a wireless interface, in particular a WLAN interface or cellular interface.

Figure 15:
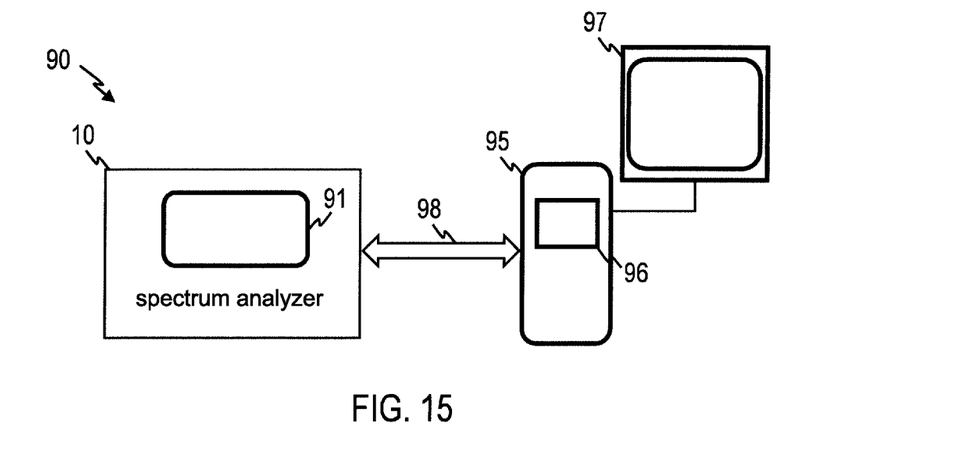
FIG. 15 is a block view of a system with a spectrum analyzer and an electronic computing unit according to an exemplary embodiment.

FIG. 15 is a block illustration of a system 10 comprising a spectrum analyzer 10 according to the invention and an electronic computing unit 95. The spectrum analyzer 10 may comprise a user interface 91 via which information about channel occupancy, signal forms, detected signals in the time or frequency space, or other information may be output.

The electronic computing unit 95 may be coupleable or coupled with the signal analyzer 10 via a unidirectional or bidirectional data connection 98. The electronic computing unit 95 is configured to process and/or store the compressed data output by the signal analyzer 10.

The electronic computing unit 95 may be configured to reconstruct at least one amplitude or power spectrum from the compressed data. Due to the compression of the data for transmission, the reconstructed amplitude or power spectrum is typically lossy.

The electronic computing unit 95 may comprise at least one integrated semiconductor circuit 96, in particular at least one processor, which is configured to generate from the compressed data a lossy illustration of the amplitude or power spectrum in the frequency space and/or frequency-time space.

The electronic computing unit 10 may be configured to access a database 60 that associates corresponding signal forms with the carrier types, depending on identifiers for carrier types included in the compressed data. The database 60 may be stored locally in the electronic computing unit 95 in a nonvolatile manner. Alternatively or additionally, the electronic computing unit 95 may be configured to retrieve the database 60 of signal forms from the spectrum analyzer 10.

The electronic computing unit 95 may be configured to perform extrapolation between a signal form 62 assigned to a carrier type defined by the compressed data and having a level (and optionally a width) defined by the compressed data and surrounding frequency ranges to reconstruct the lossy representation of the amplitude or power spectrum.

Figure 16:
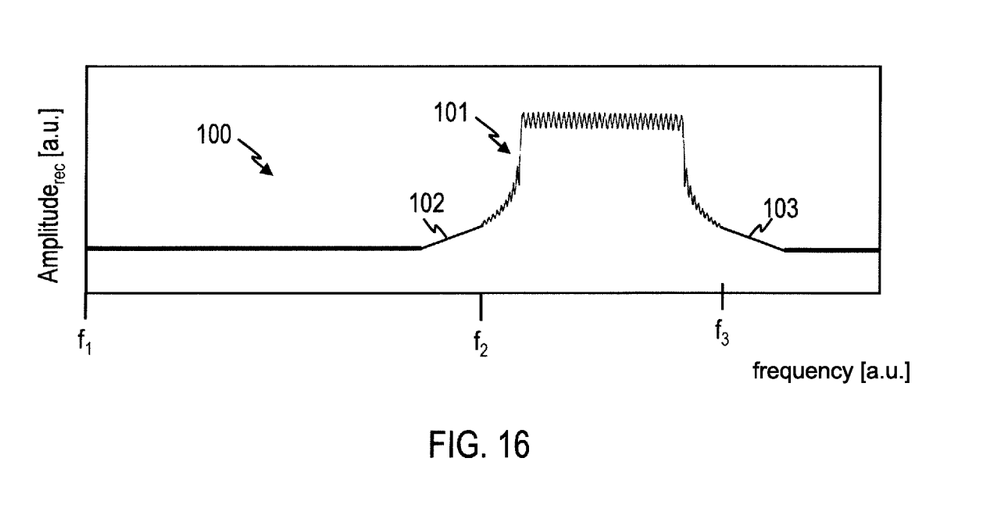
FIG. 16 is an illustration of an amplitude spectrum reconstructed from compressed data by the electronic computing unit.

FIG. 16 illustrates such processing by the electronic computing unit 95. For illustration purposes, it is assumed that an indicator for the signal form 61 of the database 60 was included in the compressed data with a corresponding level in the frequency range from $f_2$ to $f_3$. For the adjacent frequency ranges from $f_1$ to $f_2$ and starting from $f_3$, indicators were included in the compressed data showing only background noise.

For (lossy) reconstruction of the original amplitude spectrum, the electronic computing unit 95 may reconstruct the carrier 101 in the frequency range from $f_2$ to $f_3$ from the indicator for the signal form 61 and the corresponding level. At the rising and falling edges, an extrapolation 102, 103 may be made toward the adjacent constant value representing a (weak) background noise in the original amplitude spectrum.

The electronic computing unit 95 may output and/or further process the reconstructed information via a user interface 97.

The spectrum analyzer according to the invention and the method according to the invention enable the output of amplitude information (optionally also phase information, at least for certain frequency ranges) with higher real-time bandwidth due to the compression of the data before it is output from the spectrum analyzer.

The spectrum analyzer according to the invention and the method according to the invention may be used to output data to a computer or server for further processing and/or storage, without being limited thereto.

The invention claimed is:

1. A radiofrequency spectrum analyzer, in particular a real-time radiofrequency spectrum analyzer, comprising:
   a radiofrequency signal input or receiver (11) for receiving a radiofrequency signal,
   an A/D converter (12) which is configured to sample the received radiofrequency signal and generate a data stream of IQ-data,
   a digital processing circuit (13) for generating compressed data from the data stream of IQ-data, wherein parts of the radiofrequency spectrum in which only background noise is present are replaced with a constant value or the average value of the amplitude or power spectrum and/or the IQ-data in the corresponding frequency range; and
   a data interface (19) for transferring the compressed data from the radiofrequency spectrum analyzer (10).

2. The radiofrequency spectrum analyzer according to claim 1,
   wherein the digital processing circuit (13) is configured for at least sectional smoothing of the IQ-data or spectral data derived therefrom, in particular an amplitude or power spectrum, in order to generate at least part of the compressed data, wherein optionally the at least sectional smoothing comprises a threshold value comparison.

3. The radiofrequency spectrum analyzer according to claim 1,
   wherein the digital processing circuit (13) is configured to determine an amplitude or power spectrum (30) of the IQ-data and to generate at least part of the compressed data from the amplitude or power spectrum (30).

4. The radiofrequency spectrum analyzer according to claim 3,
   wherein the digital processing circuit (13) is configured for data reduction of a noise of the amplitude or power spectrum (30) in order to generate the compressed data, wherein the data reduction of the noise comprises at least sectional smoothing of the noise of the amplitude or power spectrum.

5. The radiofrequency spectrum analyzer according to claim 3,
   wherein the digital processing circuit is configured for data reduction of at least one peak (31, 32) of the amplitude or power spectrum in order to generate the compressed data, wherein optionally the data reduction of the at least one peak (31, 32) comprises smoothing.

6. The radiofrequency spectrum analyzer according to claim 5, wherein the data reduction of the at least one peak (31, 32) comprises an approximation of the peak by a predefined carrier type (61, 62), wherein an identifier for the carrier type is output in the compressed data, wherein the digital processing circuit (13) is optionally configured to determine a plurality of parameters of a parametrization of the predefined carrier type and to output the plurality of parameters as part of the compressed data, wherein optionally the predefined carrier type comprises a spectral mask of at least one communication standard, particularly a radio standard.

7. The radiofrequency spectrum analyzer according to claim 1, wherein the digital processing circuit (13) is configured to, in order to generate the compressed data for each of a plurality of frequency ranges, determine a respective level of a carrier type in the frequency range and to output the compressed data via the data interface (19) as part of the compressed data.

8. The radiofrequency spectrum analyzer according to claim 7, further comprising a storage (18) coupled with the digital processing circuit (13) for storing a plurality of predefined carrier types and/or a plurality of predefined frequency ranges, wherein optionally the plurality of predefined carrier types comprise spectral masks of at least one communication standard, particularly a radio standard, and/or wherein optionally the plurality of predefined frequency ranges comprise channels of at least one communication standard, in particular a radio standard.

9. The radiofrequency spectrum analyzer according to claim 7, wherein the digital processing circuit (13) is configured to retrieve information via a plurality of carrier types and/or a plurality of frequency ranges via the data interface or an interface of the radiofrequency spectrum analyzer separate from the data interface, wherein optionally the plurality of predefined carrier types comprises spectral masks of at least one communication standard, particularly a radio standard, and/or wherein optionally the plurality of predefined frequency ranges comprises channels of at least one communication standard, particularly a radio standard.

10. The radiofrequency spectrum analyzer according to claim 1, wherein the digital processing circuit (13) is configured to generate and output compressed data for a plurality of time intervals, respectively, wherein optionally the digital processing circuit (13) is configured to determine for at least one of the time intervals for each of a plurality of frequency ranges a respective carrier type, a position of the frequency range and a level of the carrier type in the frequency range and to output them via the data interface as part of the compressed data, wherein further optionally the digital processing circuit (13) is configured to determine a number of temporal repetitions of a radiofrequency signal and to output the same as part of the compressed data.

11. The radiofrequency spectrum analyzer according to claim 1, wherein the data interface (19) comprises at least one of the following interfaces: a USB interface, an Ethernet interface, a wireless interface, particularly a WLAN interface or cellular interface.

12. The radiofrequency spectrum analyzer according to claim 1, wherein the digital processing circuit (13) comprises at least one field-programmable gate array, FPGA.

13. A system comprising the radiofrequency spectrum analyzer according to claim 1 and an electronic computing unit coupled or coupleable with the data interface (19) for processing and/or storing the compressed data, wherein optionally the electronic computing unit is configured to reconstruct from the compressed data a lossy spectral representation of the IQ-data and/or an amplitude or power spectrum determined from the IQ-data, wherein optionally the reconstruction step comprises an access to a database of predefined carrier types (61, 62) and an extrapolation (102, 103) between at least one of the predefined carrier types (61, 62) and a constant radiofrequency signal in adjacent frequency ranges.

14. A method for outputting data from a radiofrequency spectrum analyzer (10), in particular for continuously transferring data from a real-time radiofrequency spectrum analyzer, comprising the steps of:

A/D converting detected radiofrequency signals in order to generate a data stream of IQ-data, generating compressed data from the data stream of IQ-data, wherein parts of the radiofrequency spectrum in which only background noise is present are replaced with a constant value or the average value of the amplitude or power spectrum and/or the IQ-data in the corresponding frequency range, and outputting the compressed data from the radiofrequency spectrum analyzer (10) via a data interface (19) of the radiofrequency spectrum analyzer (10).

* * * * *